(12) United States Patent
Zhou et al.

(10) Patent No.: US 10,783,370 B2
(45) Date of Patent: Sep. 22, 2020

(54) IRIS IMAGE ACQUISITION METHOD, MOBILE TERMINAL AND STORAGE MEDIUM

(71) Applicant: GUANGDONG OPPO MOBILE TELECOMMUNICATIONS CORP., LTD., Dongguan, Guangdong (CN)

(72) Inventors: Haitao Zhou, Dongguan (CN); Yibao Zhou, Dongguan (CN); Cheng Tang, Dongguan (CN); Xueyong Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 50 days.

(21) Appl. No.: 16/039,122

(22) Filed: Jul. 18, 2018

(65) Prior Publication Data

US 2019/0034722 A1    Jan. 31, 2019

(30) Foreign Application Priority Data

Jul. 31, 2017   (CN) .......................... 2017 1 0637907

(51) Int. Cl.
*G06K 9/00*    (2006.01)
*G09G 3/34*    (2006.01)
*G06K 9/20*    (2006.01)

(52) U.S. Cl.
CPC ....... *G06K 9/00604* (2013.01); *G06K 9/0061* (2013.01); *G09G 3/3406* (2013.01);
(Continued)

(58) Field of Classification Search
CPC .. G06K 9/00604; G06K 9/0061; G06K 9/209; G06K 9/2027; G06K 9/2018;
(Continued)

(56) References Cited

U.S. PATENT DOCUMENTS

| 9,396,394 B1* | 7/2016 | Solh ................... G06K 9/00617 |
| 2010/0178047 A1* | 7/2010 | Nitanda ................. H04N 5/225 396/241 |

(Continued)

FOREIGN PATENT DOCUMENTS

| CN | 103927018 A | 7/2014 |
| CN | 104394311 A | 3/2015 |

(Continued)

OTHER PUBLICATIONS

Supplementary European Search Report in European application No. 181835475, dated Jan. 7, 2019

(Continued)

*Primary Examiner* — Michael Y Mapa
(74) *Attorney, Agent, or Firm* — Ladas & Parry, LLP

(57) ABSTRACT

Embodiments disclose an iris image acquisition method and a related product. According to the method, a mobile terminal acquires a current ambient brightness value of the mobile terminal. A target working mode of an infrared acquisition device is determined according to the current ambient brightness value. An iris image of a current user is acquired in the target working mode via the infrared acquisition device.

20 Claims, 6 Drawing Sheets

(52) U.S. Cl.
CPC ............. *G06T 2207/10048* (2013.01); *G09G 2320/0626* (2013.01); *G09G 2360/144* (2013.01)

(58) Field of Classification Search
CPC ........... G09G 3/3406; G09G 2360/144; G09G 2320/0626; G06T 2207/10048
USPC ...................... 382/115–117; 455/410, 414.1
See application file for complete search history.

(56) References Cited

U.S. PATENT DOCUMENTS

| | | | |
|---|---|---|---|
| 2010/0299530 A1* | 11/2010 | Bell | G06F 21/32 713/186 |
| 2016/0012217 A1 | 1/2016 | Wolf et al. | |
| 2017/0185839 A1* | 6/2017 | Kim | G06K 9/00597 |
| 2018/0040109 A1* | 2/2018 | Hayashi | H04N 1/409 |
| 2018/0338089 A1 | 11/2018 | Choi et al. | |

FOREIGN PATENT DOCUMENTS

| | | |
|---|---|---|
| CN | 204331082 U | 5/2015 |
| CN | 105023333 A | 11/2015 |
| CN | 105279948 A | 1/2016 |
| CN | 106131426 A | 11/2016 |
| CN | 106254766 A | 12/2016 |
| CN | 106462732 A | 2/2017 |
| CN | 106611164 A | 5/2017 |
| CN | 107491743 A | 12/2017 |
| KR | 20170061990 A | 6/2017 |

OTHER PUBLICATIONS

International Search Report in international application No. PCT/CN2018/095492, dated Oct. 18, 2018.
Written Opinion of the International Search Authority in international application No. PCT/CN2018/095492, dated Oct. 18, 2018.
First Office Action of the Chinese application No. 201710637907.2, dated Mar. 20, 2020.
Second Office Action of the Chinese application No. 201710637907.2, dated Jul. 1, 2020.
First Office Action of the Australian application No. 2018310280, dated Jul. 31, 2020.

* cited by examiner

First working mode

Second working mode

IRIS IMAGE ACQUISITION METHOD, MOBILE TERMINAL AND STORAGE MEDIUM

TECHNICAL FIELD

The disclosure relates to the technical field of mobile terminals, and more particularly to an iris image acquisition method, a mobile terminal and storage medium.

BACKGROUND

Along with progress of the society and development of sciences, information interaction occurs more and more frequently. For ensuring security of information, an identity of a user is required to be verified. Therefore, recognition technologies such as fingerprint recognition, face recognition, iris recognition, vein recognition, palmprint recognition and the like are usually applied.

SUMMARY

Embodiments of the disclosure provide an iris image acquisition method, a mobile terminal and storage medium.

At a first aspect, the embodiments of the disclosure provide a mobile terminal, which may include a processor, an infrared acquisition device connected with the processor, a memory, wherein the infrared acquisition device may be configured to acquire an iris image of a current user; the memory may be configured to store an iris image template; and the processor may be configured to execute one or more actions, including obtaining a current ambient brightness value of the mobile terminal, determining a target working mode of the infrared acquisition device according to the current ambient brightness value and acquiring the iris image of the current user in the target working mode via the infrared acquisition device.

At a second aspect, the embodiments of the disclosure provide an iris image acquisition method, which may include that: a current ambient brightness value of a mobile terminal is acquired; a target working mode of an infrared acquisition device is determined according to the current ambient brightness value; and an iris image of a current user is acquired in the target working mode via the infrared acquisition device.

At a third aspect, the embodiments of the disclosure provide a non-transitory computer-readable storage medium, wherein the computer-readable storage medium may store a computer program, which, when being executed by a processor, causes the processor to execute part or all of operations described in any method of the first aspect of the embodiments of the disclosure, and the computer may include a mobile terminal.

BRIEF DESCRIPTION OF DRAWINGS

The drawings involved in the embodiments of the disclosure will be simply introduced below.

DETAILED DESCRIPTION

Figure 1:
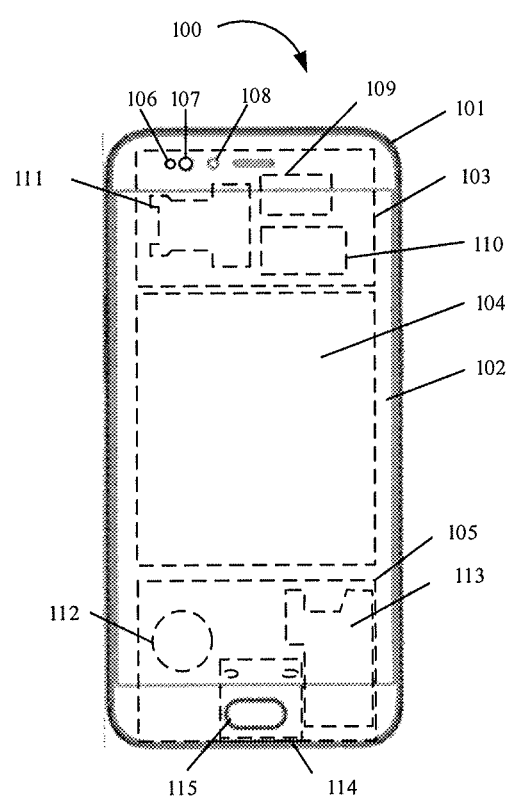
FIG. 1 illustrates a structure diagram of a mobile terminal according to an embodiment of the disclosure.

For making the solutions of the disclosure better understood by those skilled in the art, the technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art on the basis of the embodiments in the disclosure without creative work shall fall within the scope of protection of the disclosure.

Terms "first", "second" and the like in the specification, claims and drawings of the disclosure are adopted not to describe a specific sequence but to distinguish different objects. In addition, terms "include" and "have" and any transformation thereof are intended to cover nonexclusive inclusions. For example, a process, method, system, product or equipment including a series of operations or units is not limited to the operations or units which are listed, but further optionally includes operations or units which are not listed or further optionally includes other operations or units intrinsic to the process, the method, the product or the equipment.

"Embodiment" mentioned in the disclosure means that a specific characteristic, structure or feature described in combination with the embodiment may be included in at least one embodiment of the disclosure. The phrase appearing at each position in the specification does not always refer to the same embodiment as well as an independent or alternate embodiment mutually exclusive with the other embodiments. Those skilled in the art explicitly and implicitly understand that the embodiments described in the invention may be combined with the other embodiments.

At present, an iris information acquisition device includes a supplementary infrared light lamp and an infrared camera, and a wavelength of the infrared lamp is about 810 nm. Since it is difficult to narrow the frequency spectrum of the infrared lamp, 780 nm visible light beside may be driven to work together, such that a user may see red light, which influences the appearance vision. According to the iris image acquisition method, mobile terminal and storage medium provided by the embodiments of the disclosure, the target working mode of the iris acquisition device may be determined according to the current ambient brightness value. When the ambient brightness value is high, the red light may be filtered out to avoid influences on the appearance vision. When the ambient brightness value is low, the red light is used to prompt a position of the infrared acquisition device to the user. Therefore, reliability and accuracy of the iris recognition of the mobile terminal are improved.

A mobile terminal involved in the embodiments of the disclosure may include various kinds of handheld equipment with a wireless communication function, vehicle-mounted equipment, wearable equipment, computing equipment or other processing equipment connected to a wireless modem and various forms of User Equipment (UE), Mobile Stations (MSs), terminal devices and the like. For convenient description, the equipment mentioned above is collectively referred to as mobile terminal.

The mobile terminal described in the embodiments of the disclosure is provided with a biological image acquisition device, and the biological image acquisition device specifically includes a fingerprint information acquisition device, an iris information acquisition device and a face information acquisition device, the fingerprint information acquisition device may be a fingerprint sensor, the iris information acquisition device may include a supplementary infrared light lamp and an iris camera, and the face information acquisition device may be a universal camera, for example, a front camera. The embodiments of the disclosure will be introduced below in combination with the drawings in detail.

Turning to FIG. 1, FIG. 1 illustrates a structure diagram of a mobile terminal 100 according to an embodiment of the disclosure. The mobile terminal 100 includes a casing 101, a touch display screen 102, a mainboard 103, a battery 104, and an auxiliary board 105. A supplementary infrared light lamp 106, an iris camera 107, a front camera 108, a processor 109, a memory 110, a Subscriber Identity Module (SIM) card slot 111 and the like are arranged on the mainboard 103. A vibrator 112, an integrated sound cavity 113, a VOOC interface 114 and a fingerprint module 115 are arranged on the auxiliary board 105. The supplementary infrared light lamp 106 and the iris camera 107 form an iris information acquisition device of the mobile terminal 100. The front camera 108 forms a face information acquisition device of the mobile terminal 100. The fingerprint sensor module 115 forms a fingerprint information acquisition device of the mobile terminal 100. The iris information acquisition device, the face information acquisition device and the fingerprint information acquisition device are collectively referred to as a biological information acquisition device of the mobile terminal 100.

When the biological information acquisition device is the iris information acquisition device, the supplementary infrared light lamp 106 is configured to emit infrared light to irradiate an iris of a user to form reflected light, the iris camera 107 is configured to acquire the reflected light to form an iris image, and the processor 110, after acquiring the iris image, executes a processing process of iris image quality assessment, iris region positioning (including rough positioning and fine positioning), iris preprocessing and iris feature point extraction, generation of an iris template and the like for the iris image, and a generated iris template is biological information.

Specifically, acquisition of the biological information may be implementing by the biological information acquisition device acquiring a biological image of the user.

The infrared acquisition device is configured to acquire an iris image of a current user.

The memory is configured to store an iris image template.

The processor 110 is configured to execute one or more actions, including: obtaining a current ambient brightness value of the mobile terminal, determining a target working mode of the infrared acquisition device according to the current ambient brightness value and acquiring the iris image of the current user in the target working mode via the infrared acquisition device.

It can be seen that, in the embodiment of the disclosure, the mobile terminal obtains the current ambient brightness value of the mobile terminal at first, then determines the target working mode of the infrared acquisition device according to the current ambient brightness value and finally acquires the iris image of the current user in the target working mode via the infrared acquisition device. Before iris recognition, the mobile terminal determines the current ambient brightness value at first and determines the target working mode of the infrared acquisition device according to the ambient brightness value, which helps prompt a position of the infrared acquisition device to the user under lower ambient brightness, so that reliability and accuracy of the iris recognition of the mobile terminal are improved.

In a possible example, the infrared acquisition device includes an infrared camera and a supplementary infrared light device. The supplementary infrared light device includes a supplementary infrared light lamp and a light filter (e.g., controllable light filter). Working modes of the infrared acquisition device include a first working mode and a second working mode. In the first working mode, infrared light emitted by the supplementary infrared light lamp is filtered through the controllable light filter; and in the second working mode, the infrared light emitted by the supplementary infrared light lamp is not filtered through the controllable light filter.

In the possible example, the one or more actions may further include: in response to determination of the target working mode of the infrared acquisition device being the first working mode, locating the light filter to be aligned with the supplementary infrared light lamp in a light-emitting direction of the supplementary infrared light lamp (e.g., rotating the controllable light filter to be oriented towards a light-emitting direction of the supplementary infrared light lamp to result in that a contact area of the controllable light filter and the supplementary infrared light lamp is 1); or, in response to determination of the target working mode of the infrared acquisition device being the second working mode, locating the light filter to be non-overlap with the supplementary infrared light lamp when observed in the light-emitting direction of the supplementary infrared light lamp (e.g., rotate the controllable light filter to be oriented towards a non-light-emitting direction of the supplementary infrared light lamp to result in that the contact area of the controllable light filter and the supplementary infrared light lamp is 0).

In a possible example, the action of determining the target working mode of the infrared acquisition device according to the current ambient brightness value may include: determining the target working mode of the infrared acquisition device according to a pre-stored mapping relationship between the current ambient brightness value and the working modes of the infrared acquisition device.

In the possible example, the action of determining the target working mode of the infrared acquisition device according to the pre-stored mapping relationship between the current ambient brightness value and the working modes of the infrared acquisition device may include: in response to obtaining of the current ambient brightness value being greater than or equal to a preset brightness threshold value, determining that the target working mode of the infrared acquisition device is the first working mode; and in response to obtaining of the current ambient brightness value being lower than the preset brightness threshold value, determining that the target working mode of the infrared acquisition device is the second working mode.

Figure 2:
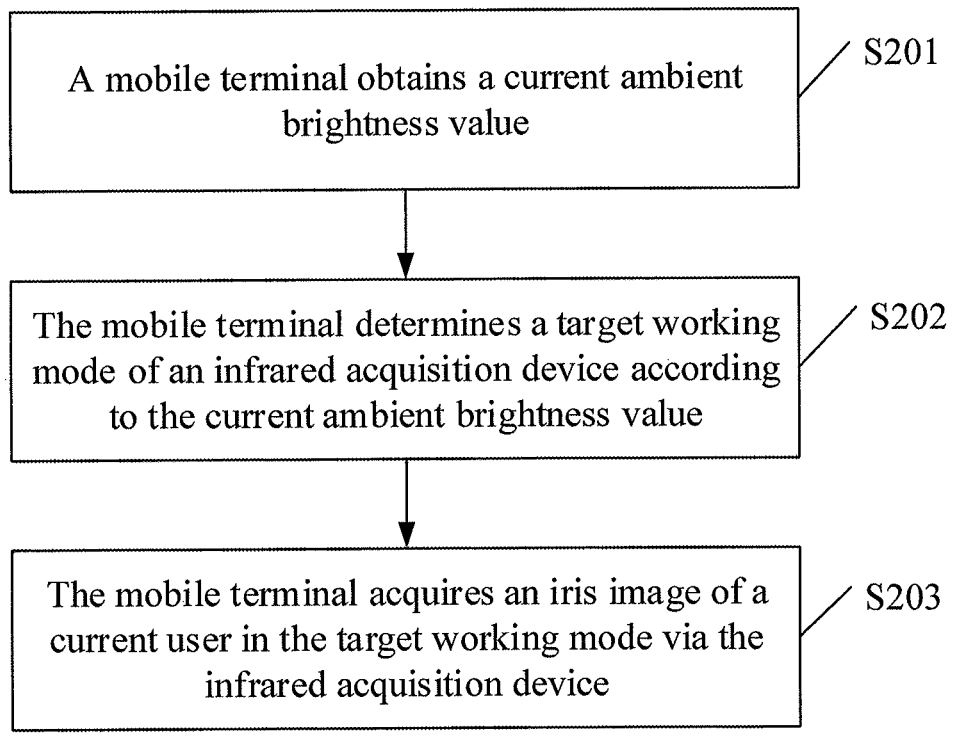
FIG. 2 illustrates a flowchart of an iris image acquisition method according to an embodiment of the disclosure.

Turning to FIG. 2, FIG. 2 illustrates a flowchart of an iris image acquisition method according to an embodiment of the disclosure. The iris image acquisition method is applied to a mobile terminal, and as shown in the figure, includes the following operations illustrated in blocks. The operations may begin from block S201.

In block S201, the mobile terminal acquires a current ambient brightness value of the mobile terminal.

Herein, the mobile terminal may acquire the current ambient brightness value through a sensor, for example, a light sensor.

When the mobile terminal is located in different environments or places, different ambient brightness values may be detected. Ambient brightness in the embodiment of the disclosure may be ambient luminance, and for different places, different proper common luminance may usually be adopted. For example, best luminance of a bedroom is usually 150-300 Lux, best luminance of a study room is usually about 100 Lux, luminance of a corridor and a staircase is usually 40-80 Lux, and luminance of a garage and a warehouse is usually about 30-70 Lux, where Lux is a unit of luminance. Under a full moon, luminance generated on the ground is 0.2 Lux, and at this moment, it is darker and ambient brightness is lower.

In block S202, the mobile terminal determines a target working mode of an infrared acquisition device according to the current ambient brightness value.

Herein, the infrared acquisition device has greater than one working modes, and the specific working mode to be adopted by the infrared acquisition device may be determined according to the detected current ambient brightness value.

In block S203, the mobile terminal acquires an iris image of a current user in the target working mode via the infrared acquisition device.

Herein, after the target working mode of the infrared acquisition device is determined, the infrared acquisition device may be switched to the target working mode to acquire the iris image of the user.

It can be seen that, in the embodiment of the disclosure, the mobile terminal obtains the current ambient brightness value of the mobile terminal at first, then determines the target working mode of the infrared acquisition device according to the current ambient brightness value and finally acquires the iris image of the current user in the target working mode via the infrared acquisition device. Before iris recognition, the mobile terminal determines the current ambient brightness value at first and determines the target working mode of the infrared acquisition device according to the ambient brightness value, which helps prompt a position of the infrared acquisition device to the user under lower ambient brightness, so that reliability and accuracy of the iris recognition of the mobile terminal are improved.

In a possible example, the infrared acquisition device includes an infrared camera and a supplementary infrared light device. The supplementary infrared light device includes a supplementary infrared light lamp and a controllable light filter. Working modes of the infrared acquisition device include a first working mode and a second working mode. In the first working mode, infrared light emitted by the supplementary infrared light lamp is filtered through the controllable light filter; and in the second working mode, the infrared light emitted by the supplementary infrared light lamp is not filtered through the controllable light filter.

The infrared acquisition device may include the infrared camera and the supplementary infrared light device, the infrared camera is configured to acquire infrared light reflected by an iris of the user to form an iris image, and the supplementary infrared light device may emit the infrared light.

Figure 3:
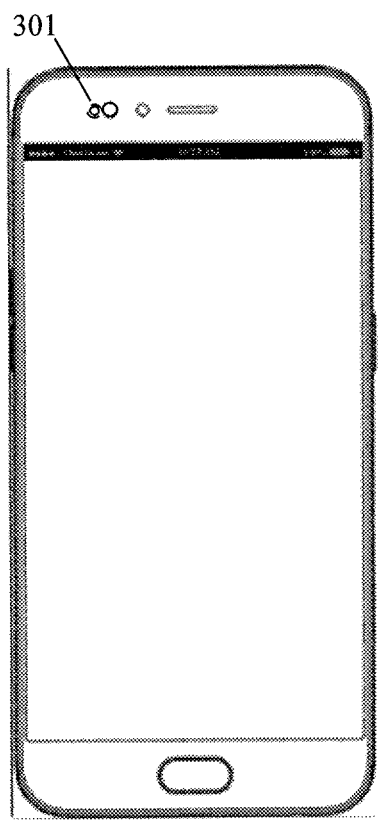
FIG. 3 illustrates an example structure diagram of a mobile terminal including a controllable light filter according to an embodiment of the disclosure.

The supplementary infrared light device may include the supplementary infrared light lamp and the controllable light filter. FIG. 3 is a possible schematic diagram of a light filter according to an embodiment of the disclosure, where 301 is the light filter. The supplementary infrared light lamp is configured to emit the infrared light, and the light filter is configured to filter the light of a specific part and allow the light of the other part to pass through.

When a wavelength of the infrared lamp is 810 nm, since it is difficult to narrow a frequency spectrum of the infrared lamp, 780 nm visible light beside may be driven to work together, such that the user may see red light, which influences appearance vision of the user. Therefore, the visible light may be filtered by the light filter, only the infrared light is reserved, and at this moment, the user may not see any red light.

For the controllable light filter, transmittance of infrared light with a wavelength of greater than or equal to 810 nm may be higher than 80%, and transmittance of visible light with a wavelength of smaller than 810 nm may be lower than 5%.

A position of the controllable light filter may be regulated, so that the infrared acquisition device has the two working modes. In the first working mode, the infrared light emitted by the supplementary infrared light lamp is filtered through the controllable light filter, and in the second working mode, the infrared light emitted by the supplementary infrared light lamp is not filtered through the controllable light filter. A position relationship between the controllable light filter and an infrared flashlight may be changed to implement switching between the first working mode and the second working mode.

It can be seen that, in the example, the controllable light filter is added into the supplementary infrared light device to endow the supplementary infrared light device with the two working modes, namely using the light filter and not using the light filter, corresponding to different beneficial effects respectively, so that improvement of richness of functions of the supplementary infrared light device is facilitated.

In the possible example, the operation of determining the target working mode of the infrared acquisition device according to the current ambient brightness value includes that: in response to determination of the target working mode of the infrared acquisition device being the first working mode, the light filter is located to be aligned with the supplementary infrared light lamp in a light-emitting direction of the supplementary infrared light lamp (e.g., the controllable light filter is rotated to be oriented towards a light-emitting direction of the supplementary infrared light lamp to result in that a contact area of the controllable light filter and the supplementary infrared light lamp is 1); or, in response to determination of the target working mode of the infrared acquisition device being the second working mode, the light filter is located to be non-overlap with the supplementary infrared light lamp when observed in the light-emitting direction of the supplementary infrared light lamp (e.g., the controllable light filter is rotated to be oriented towards a non-light-emitting direction of the supplementary infrared light lamp to result in that the contact area of the controllable light filter and the supplementary infrared light lamp is 0).

Figure 4:
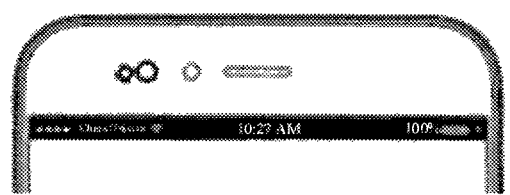
FIG. 4 illustrates a schematic view of a first working mode and a second working mode according to an embodiment of the disclosure.
Figure 4:
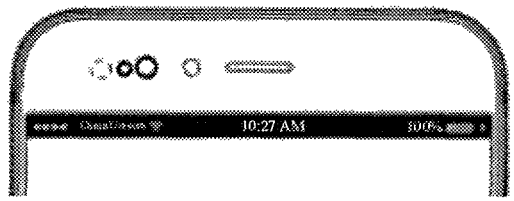

In the first working mode, the infrared light emitted by the supplementary infrared light lamp is filtered through the controllable light filter. For implementing the first working mode of the infrared acquisition device, a rotating base may be arranged for the controllable light filter, and when the light filter is located to be aligned with the supplementary infrared light lamp in a light-emitting direction of the supplementary infrared light lamp (e.g., the controllable light filter is rotated to be oriented with the light-emitting direction of the supplementary infrared light lamp) and the contact area of the controllable light filter and the supplementary infrared light lamp is 1, all the light emitted by the supplementary infrared light lamp may pass through the light filter at this moment, and the light filter may filter out visible light. In the second working mode, the infrared light emitted by the supplementary infrared light lamp is not filtered through the controllable light filter. For implementing the second working mode of the infrared acquisition device, the light filter may be located to be non-overlap with the supplementary infrared light lamp when observed in the light-emitting direction of the supplementary infrared light lamp (e.g., the controllable light filter may be rotated to be oriented towards the non-light-emitting direction of the supplementary infrared light lamp), and at this moment, the contact area of the controllable light filter and the supplementary infrared light lamp is 0, and all the light emitted by the supplementary infrared light lamp may not pass through the light filter. FIG. 4 illustrates a schematic view when the infrared acquisition device works in the first working mode and the second working mode.

Change of the position relationship between the controllable light filter and the supplementary infrared light lamp to implement switching between the first working mode and the second working mode, may be implemented not only by controlling rotation of the controllable light filter but also by sliding the controllable light filter. The position relationship between the controllable light filter and the supplementary infrared light lamp is changed through a driving device to implement switching between the first working mode and the second working mode.

It can be seen that, in the example, the position of the controllable light filter is changed to implement switching between the first working mode and second working mode of the supplementary infrared light device, so that improvement of the richness of the functions of the supplementary infrared light device is facilitated.

In a possible example, the operation of determining the target working mode of the infrared acquisition device according to the current ambient brightness value may include determining the target working mode of the infrared acquisition device according to a pre-stored mapping relationship between the current ambient brightness value and the working modes of the infrared acquisition device.

Regarding determination of the target working mode of the infrared acquisition device according to the current ambient brightness value, the mobile terminal may establish a mapping relationship between ambient brightness and a working mode of the infrared acquisition device, and after the current ambient brightness value is determined, the mobile terminal may query the mapping relationship, thereby determining the target working mode of the infrared acquisition device.

It can be seen that, in the example, the user may establish a mapping relationship between a current ambient brightness value and a working mode of the infrared acquisition device in a customization manner, so that the mobile terminal may automatically switch the infrared acquisition device to the corresponding target working mode after the current ambient brightness value is determined, and improvement of a user experience is facilitated.

In the possible example, the operation of determining the target working mode, of the infrared acquisition device according to the pre-stored mapping relationship between the current ambient brightness value and the working modes of the infrared acquisition device may include: in response to obtaining of the current ambient brightness value being greater than or equal to a preset brightness threshold value, determining that the target working mode is the first working mode; and in response to obtaining of the current ambient brightness value being lower than the preset brightness threshold value, determining the target working mode is the second working mode.

The pre-stored mapping relationship between the ambient brightness value and the infrared camera may be that: when the ambient brightness value is greater than or equal to the preset brightness threshold value, the corresponding target working mode is the first working mode, and when the current ambient brightness value is lower than the preset brightness threshold value, the target working mode is the second working mode. For example, the preset brightness threshold value is 1 Lux, and when the user is in a darker environment and, meanwhile, ambient brightness is lower than 1 Lux, the user may not see clearly a position of the infrared camera during iris recognition, so that accuracy of iris image acquisition may be influenced. At this moment, the supplementary infrared light device may work in the second working mode, so that the user may see red light, and thus roughly know the position of the infrared acquisition device, and iris recognition may be performed.

It can be seen that, in the example, the supplementary infrared light device is switched to the second working mode under a low-light condition, and then the user may see visible red light emitted by the supplementary infrared light lamp, so that the position of the infrared acquisition device may be prompted, and improvement of accuracy of the iris image acquisition is facilitated.

Figure 5:
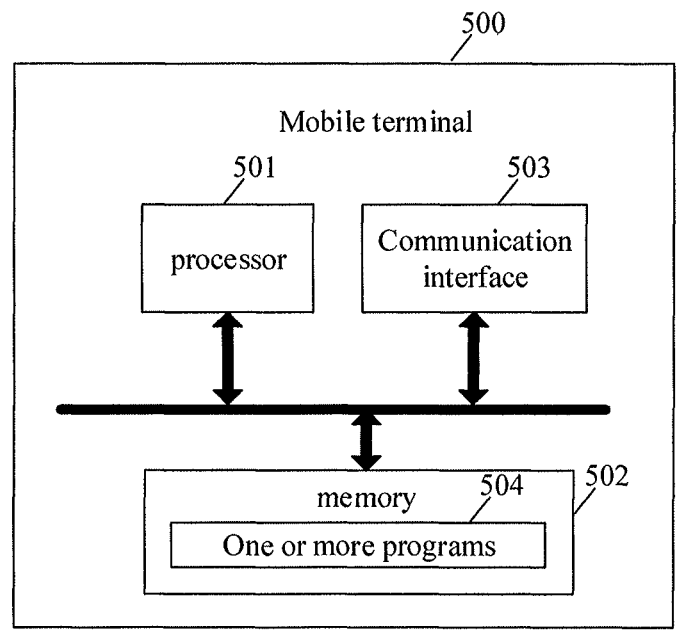
FIG. 5 illustrates a structure diagram of a mobile terminal according to an embodiment of the disclosure.

Consistently with the embodiment shown in FIG. 2, Turning to FIG. 5, FIG. 5 illustrates a structure diagram of a mobile terminal according to an embodiment of the disclosure. As shown in the figure, the mobile terminal 500 includes a processor 501, a memory 502, a communication interface 503 and one or more programs 504, wherein the one or more programs 504 are stored in the memory 502, and are configured to be executed by the processor 501, and the programs include instructions configured to execute one or more action including: obtaining a current ambient brightness value of the mobile terminal; determining a target working mode of an infrared acquisition device according to the current ambient brightness value; and acquiring an iris image of a current user in the target working mode via the infrared acquisition device.

It can be seen that, in the embodiment of the disclosure, the mobile terminal obtains the current ambient brightness value of the mobile terminal at first, then determines the target working mode of the infrared acquisition device according to the current ambient brightness value and finally acquires the iris image of the current user in the target working mode via the infrared acquisition device. Before iris recognition, the mobile terminal determines the current ambient brightness value at first and determines the target working mode of the infrared acquisition device according to the ambient brightness value, which helps prompt a position of the infrared acquisition device to the user under lower ambient brightness, so that reliability and accuracy of the iris recognition of the mobile terminal are improved.

In a possible example, the infrared acquisition device includes an infrared camera and a supplementary infrared light device. The supplementary infrared light device includes a supplementary infrared light lamp and a controllable light filter. Working modes of the infrared acquisition device include a first working mode and a second working mode.

In the first working mode, infrared light emitted by the supplementary infrared light lamp is filtered through the controllable light filter.

In the second working mode, the infrared light emitted by the supplementary infrared light lamp is not filtered through the controllable light filter.

In a possible example, the one or more actions further may further include: in response to determination of the target working mode of the infrared acquisition device being the first working mode, locating the light filter to be aligned with the supplementary infrared light lamp in a light-emitting direction of the supplementary infrared light lamp (e.g., rotating the controllable light filter to be oriented towards a light-emitting direction of the supplementary infrared light lamp to result in that a contact area of the controllable light filter and the supplementary infrared light lamp is 1); or, in response to determination of the target working mode of the infrared acquisition device being the second working mode, locating the light filter to be non-overlap with the supplementary infrared light lamp when observed in the light-emitting direction of the supplementary infrared light lamp (e.g., rotating the controllable light filter to be oriented towards a non-light-emitting direction of the supplementary infrared light lamp to result in that the contact area of the controllable light filter and the supplementary infrared light lamp is 0).

In a possible example, the action of determining the target working mode of the infrared acquisition device according to the current ambient brightness value may include: determining the target working mode of the infrared acquisition device according to a pre-stored mapping relationship between the current ambient brightness value and the working modes of the infrared acquisition device.

In a possible example, the action of determining the target working mode of the infrared acquisition device according to the pre-stored mapping relationship between the ambient brightness values and the working modes of the infrared acquisition device may include: in response to obtaining of the current ambient brightness value being greater than or equal to a preset brightness threshold value, determining that the target working mode is the first working mode; and in response to obtaining of the current ambient brightness value being lower than the preset brightness threshold value, determining that the target working mode is the second working mode.

The solutions of the embodiments of the disclosure are mainly introduced above from the view of an execution process on a method side. It can be understood that the mobile terminal, for realizing the functions, includes a corresponding hardware structure and/or software module executing each function. Those skilled in the art may easily realize that the units or algorithm steps of each example described in combination with the embodiments disclosed in the disclosure may be implemented in form of hardware or a combination of the hardware and computer software in the disclosure. Whether a certain function is executed in a manner of hardware or driving the hardware by computer software depends on specific applications and design constraints of the technical solutions. Professionals may realize the described functions for each specific application by virtue of different methods, but such realization shall fall within the scope of the disclosure.

Function units of the mobile terminal may be divided according to the abovementioned method examples in the embodiment of the disclosure. For example, each function unit corresponding to each function may be divided, and two or greater than two functions may also be integrated into a processing unit. The integrated unit may be implemented in form of hardware and may also be implemented in form of software function unit. It is to be noted that division of the units in the embodiment of the disclosure is only schematic and is only logic function division, and another division manner may be adopted during practical implementation.

Figure 6:
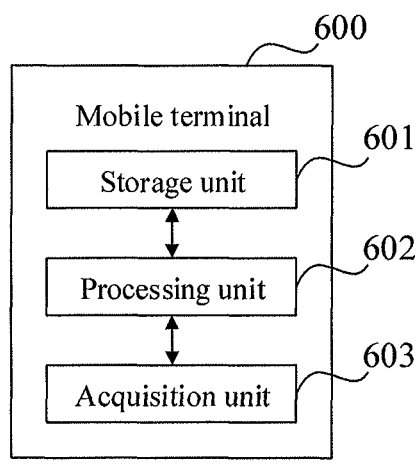
FIG. 6 illustrates a composition block diagram of function units of a mobile terminal according to an embodiment of the disclosure.

Under the condition of adopting integrated units, FIG. 6 illustrates a possible composition block diagram of function units of the mobile terminal involved in the embodiment. The mobile terminal 600 includes a processing unit 602 and an acquisition unit 603. The processing unit 602 is configured to perform control and management on actions of the mobile terminal. For example, the processing unit 602 is configured to support the mobile terminal to execute blocks S201-S203 in FIG. 2 and/or is configured for other processes of a technology described in the disclosure. The acquisition unit 603 is configured to support communication between the mobile terminal and other equipment. The mobile terminal may further include a storage unit 601, configured to store program codes and data of the mobile terminal.

The processing unit 602 is configured to obtain a current ambient brightness value of the mobile terminal, is configured to determine a target working mode of an infrared acquisition device according to the current ambient brightness value, and is configured to acquire an iris image of a current user in the target working mode via the acquisition unit in the infrared acquisition device.

In a possible example, the infrared acquisition device includes an infrared camera and a supplementary infrared light device. The supplementary infrared light device includes a supplementary infrared light lamp and a controllable light filter. Working modes of the infrared acquisition device include a first working mode and a second working mode. In the first working mode, infrared light emitted by the supplementary infrared light lamp is filtered through the controllable light filter; and in the second working mode, the infrared light emitted by the supplementary infrared light lamp is not filtered through the controllable light filter.

In a possible example, in terms of determination of the target working mode of the infrared acquisition device according to the current ambient brightness value, the processing unit 602 is specifically configured to: in response to determination of the target working mode of the infrared acquisition device being the first working mode, locate the light filter to be aligned with the supplementary infrared light lamp in a light-emitting direction of the supplementary infrared light lamp (e.g., rotate the controllable light filter to be oriented towards a light-emitting direction of the supplementary infrared light lamp to result in that a contact area of the controllable light filter and the supplementary infrared light lamp is 1); or, in response to determination of the target working mode of the infrared acquisition device being the second working mode, locate the light filter to be non-overlap with the supplementary infrared light lamp when observed in the light-emitting direction of the supplementary infrared light lamp (e.g., rotate the controllable light filter to be oriented towards a non-light-emitting direction of the supplementary infrared light lamp to result in that the contact area of the controllable light filter and the supplementary infrared light lamp is 0).

In a possible example, in terms of determination of the target working mode of the infrared acquisition device according to the current ambient brightness value, the processing unit 602 is specifically configured to determine the target working mode of the infrared acquisition device according to a pre-stored mapping relationship between the current ambient brightness value and the working modes of the infrared acquisition device.

In a possible example, in terms of determination of the target working mode of the infrared acquisition device according to the pre-stored mapping relationship between the current ambient brightness value and the working modes of the infrared acquisition device, the processing unit 602 is specifically configured to: in response to obtaining of the current ambient brightness value being greater than or equal to a preset brightness threshold value, determine that the target working mode is the first working mode; and in response to obtaining of the current ambient brightness value being lower than the preset brightness threshold value, determine that the target working mode is the second working mode.

The processing unit 602 may be a processor or a controller, the acquisition unit 603 may be a biological information acquisition device, for example, an iris information acquisition device, a face information acquisition device and a fingerprint information acquisition device, and the storage unit 601 may be a memory.

An embodiment of the disclosure further provides a computer storage medium, wherein the computer storage medium stores a computer program for electronic data exchange, the computer program enables a computer to execute part or all of operations of any method recorded in the abovementioned method embodiments, and the computer includes a mobile terminal.

Figure 7:
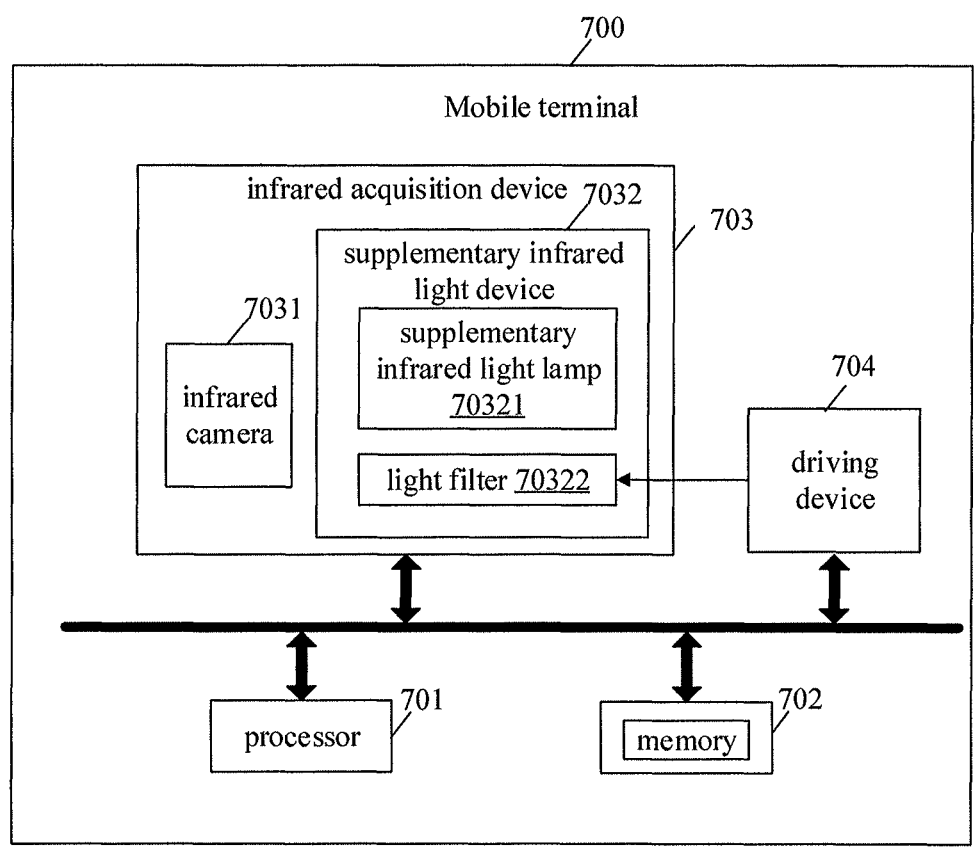
FIG. 7 illustrates a structure diagram of a mobile terminal according to an embodiment of the disclosure.

FIG. 7 illustrates a structure diagram of a mobile terminal 700 according to an embodiment of the disclosure. The mobile terminal 700 is an implementation of the mobile terminal 500 as illustrated in FIG. 5. As illustrated in FIG. 7, the mobile terminal includes a processor 701, a memory 702, and an infrared acquisition device 703 connected with the processor 701. The infrared acquisition device 703 is configured to acquire an iris image of a current user. The memory 702 is configured to store an iris image template. The processor 701 is configured to execute one or more actions, including: obtaining a current ambient brightness value of the mobile terminal, determining a target working mode of the infrared acquisition device according to the current ambient brightness value, and acquiring the iris image of the current user in the target working mode via the infrared acquisition device.

In an example, the infrared acquisition device 703 may include an infrared camera 7031 and a supplementary infrared light device 7032. The supplementary infrared light device 7032 may include a supplementary infrared light lamp 70321 and a light filter 70322. Working modes of the infrared acquisition device 703 includes a first working mode and a second working mode. In the first working mode, infrared light emitted by the supplementary infrared light lamp 70321 is filtered through the light filter 70322. In the second working mode, the infrared light emitted by the supplementary infrared light lamp 70321 is not filtered through the light filter 70322.

In an example, the one or more actions may further include: in response to determination of the target working mode of the infrared acquisition being the first working mode, locating the light filter 70322 to be aligned with the supplementary infrared light lamp 70321 in a light-emitting direction of the supplementary infrared light lamp 70321; or, in response to determination of the target working mode of the infrared acquisition being the second working mode, locating the light filter 70322 to be non-overlap with the supplementary infrared light lamp 70321 when observed in the light-emitting direction of the supplementary infrared light lamp 70321.

In an example, the action of determining the target working mode of the infrared acquisition device according to the current ambient brightness value may include determining the target working mode of the infrared acquisition device according to a pre-stored mapping relationship between the current ambient brightness value and the working modes of the infrared acquisition device.

In an example, the action of determining the target working mode of the infrared acquisition device according to the pre-stored mapping relationship between the current ambient brightness value and the working modes of the infrared acquisition device may include: in response to obtaining of the current ambient brightness value being greater than or equal to a preset brightness threshold value, determine that the target working mode is the first working mode; and in response to obtaining of the current ambient brightness value being lower than the preset brightness threshold value, determine that the target working mode is the second working mode.

In an example, the mobile terminal may further include a driving device 704 controlled by the processor 701 and connected to the light filter 70322, the processor 701 is configured to change a relative position relationship between the light filter 70322 and the supplementary infrared light lamp 70321 by performing rotation control or sliding control over the light filter 70322 through the driving device 704, so as to implement switching between the first working mode and the second working mode.

In an example, the processor 701 may be further configured to perform iris image quality assessment, iris region positioning, iris preprocessing and iris feature point extraction, so as to generate the iris template, after the iris image is acquired.

An embodiment of the disclosure further provides a computer program product, the computer program product includes a non-transitory computer-readable storage medium storing a computer program, and the computer program may be operated to enable a computer to execute part or all of operations of any method recorded in the abovementioned method embodiments. The computer program product may be a software installation packet, and the computer includes a mobile terminal.

It is to be noted that, for simple description, each method embodiment is expressed as a combination of a series of actions. However, those skilled in the art should know that the disclosure is not limited to a described action sequence, and this is because, according to the disclosure, some operations may be executed in another sequence or at the same time. Second, those skilled in the art should also know that all of the embodiments described in the specification belong to preferred embodiments and involved actions and modules are not always necessary to the disclosure.

In the embodiments, each embodiment is described with different emphases and parts which are not elaborated in a certain embodiment may refer to related descriptions in the other embodiments.

In some embodiments provided by the application, it should be understood that the disclosed device may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also physically exist independently, and two or greater than two units may also be integrated into a unit. The integrated unit may be implemented in form of hardware and may also be implemented in form of software function unit.

When being implemented in form of software function unit and sold or used as an independent product, the unit may be stored in a computer-readable storage medium. Based on such an understanding, the technical solutions of the disclosure substantially or parts making contributions to the conventional art or all or part of the technical solutions may be embodied in form of software product, and the computer software product is stored in a memory, including a plurality of instructions configured to enable a piece of computer equipment (which may be a personal computer, a server, network equipment or the like) to execute all or part of the operations of the method in each embodiment of the disclosure. The memory includes: various media capable of storing program codes such as a U disk, a Read-Only Memory (ROM), a Random Access Memory (RAM), a mobile hard disk, a magnetic disk or an optical disk.

Those of ordinary skilled in the art should know that all or part of the operations in various methods of the embodiments may be implemented by related hardware instructed by a program, the program may be stored in a computer-readable memory, and the memory may include: a flash disk, a ROM, a RAM, a magnetic disk, an optical disk or the like.

The embodiments of the disclosure are introduced above in detail. The principle and implementation mode of the disclosure are elaborated with specific examples in the disclosure. The above descriptions about the embodiments are only intended to help the method of the disclosure and the core concept thereof to be understood. In addition, those of ordinary skilled in the art may make changes to the specific implementation mode and the application range according to the concept of the disclosure. From the above, the contents of the specification should not be understood as limits to the disclosure.

The invention claimed is:

1. A mobile terminal, comprising a processor, an infrared acquisition device connected with the processor, a memory, wherein
the infrared acquisition device is configured to acquire an iris image of a current user;
the memory is configured to store an iris image template; and
the processor is configured to execute one or more actions, comprising:
obtaining a current ambient brightness value of the mobile terminal,
determining a target working mode of the infrared acquisition device according to the current ambient brightness value, and
acquiring the iris image of the current user in the target working mode via the infrared acquisition device,
wherein the infrared acquisition device comprises an infrared camera and a supplementary infrared light device, and wherein
the supplementary infrared light device comprises a supplementary infrared light lamp and a light filter;
the target working mode of the infrared acquisition device comprises a first working mode and a second working mode;
in the first working mode, light emitted by the supplementary infrared light lamp is filtered through the light filter so as to filter out part of visible light; and
in the second working mode, the light emitted by the supplementary infrared light lamp is not filtered through the light filter, and in response to the infrared light lamp not being filtered by the light filter, prompts a position of the infrared acquisition device via the visible light.

2. The mobile terminal according to claim 1, wherein the one or more actions further comprise:
in response to determination of the target working mode of the infrared acquisition device being the first working mode, locating the light filter to be aligned with the supplementary infrared light lamp in a light-emitting direction of the supplementary infrared light lamp; or,
in response to determination of the target working mode of the infrared acquisition device being the second working mode, locating the light filter to be non-overlap with the supplementary infrared light lamp when observed in the light-emitting direction of the supplementary infrared light lamp.

3. The mobile terminal according to claim 1, wherein determining the target working mode of the infrared acquisition device according to the current ambient brightness value comprises:
determining the target working mode of the infrared acquisition device according to a pre-stored mapping relationship between the current ambient brightness value and the working modes of the infrared acquisition device.

4. The mobile terminal according to claim 3, wherein determining the target working mode of the infrared acquisition device according to a pre-stored mapping relationship between the current ambient brightness value and the working modes of the infrared acquisition device comprises:
in response to obtaining of the current ambient brightness value being greater than or equal to a preset brightness threshold value, determining that the target working mode is the first working mode; and
in response to obtaining of the current ambient brightness value being lower than the preset brightness threshold value, determining that the target working mode is the second working mode.

5. The mobile terminal according to claim 1, further comprising a driving device controlled by the processor and connected to the light filter, wherein the one or more actions further comprise:
changing a relative position relationship between the light filter and the supplementary infrared light lamp by performing rotation control or sliding control over the light filter through the driving device, so as to implement switching between the first working mode and the second working mode.

6. The mobile terminal according to claim 1, wherein the one or more actions further comprise:
performing iris image quality assessment, iris region positioning, iris preprocessing and iris feature point extraction, so as to generate the iris template, after the iris image is acquired.

7. The mobile terminal according to claim 1, wherein for the light filter, transmittance of infrared light with a wavelength of greater than or equal to 810 nm is higher than 80%, and transmittance of visible light with a wavelength of smaller than 810 nm is lower than 5%.

8. An iris image acquisition method, applied to a mobile terminal comprising an infrared acquisition device, the method comprising:
obtaining a current ambient brightness value of the mobile terminal; determining a target working mode of the infrared acquisition device according to the current ambient brightness value; and
acquiring an iris image of a current user in the target working mode via the infrared acquisition device,
wherein the infrared acquisition device comprises an infrared camera and a supplementary infrared light device, wherein
the supplementary infrared light device comprises a supplementary infrared light lamp and a light filter;
the target working mode of the infrared acquisition device comprises a first working mode and a second working mode;
in the first working mode, light emitted by the supplementary infrared light lamp is filtered through the light filter so as to filter out part of visible light; and
in the second working mode, the light emitted by the supplementary infrared light lamp is not filtered through the light filter, and in response to the infrared light lamp not being filtered by the light filter, prompts a position of the infrared acquisition device via the visible light.

9. The method according to claim 8, wherein determining the target working mode of the infrared acquisition device according to the current ambient brightness value comprises:
in response to determination of the target working mode being the first working mode, locating the light filter to be aligned with the supplementary infrared light lamp in a light-emitting direction of the supplementary infrared light lamp; or,
in response to determination of the target working mode being the second working mode, locating the light filter to be non-overlap with the supplementary infrared light lamp when observed in the light-emitting direction of the supplementary infrared light lamp.

10. The method according to claim 8, wherein determining the target working mode of the infrared acquisition device according to the current ambient brightness value comprises:
determining the target working mode of the infrared acquisition device according to a pre-stored mapping relationship between the current ambient brightness value and the working modes of the infrared acquisition device.

11. The method according to claim 10, wherein determining the target working mode of the infrared acquisition device according to the pre-stored mapping relationship between the current ambient brightness value and the working modes of the infrared acquisition device comprises:
in response to obtaining of the current ambient brightness value being greater than or equal to a preset brightness threshold value, determining that the target working mode is the first working mode; and
in response to obtaining of the current ambient brightness value being lower than the preset brightness threshold value, determining that the target working mode is the second working mode.

12. The method according to claim 8, wherein the mobile terminal further comprises a driving device controlled by the processor and connected to the light filter, and
wherein controlling the infrared acquisition device to acquire an iris image of a current user in the target working mode comprises:
changing a relative position relationship between the light filter and the supplementary infrared light lamp by performing rotation control or sliding control over the light filter through the driving device, so as to implement switching between the first working mode and the second working mode.

13. The method according to claim 8, further comprising:
performing iris image quality assessment, iris region positioning, iris preprocessing and iris feature point extraction, to generate an iris template, after the iris image is acquired.

14. The method according to claim 8, wherein for the light filter, transmittance of infrared light with a wavelength of greater than or equal to 810 nm is higher than 80%, and transmittance of visible light with a wavelength of smaller than 810 nm is lower than 5%.

15. A non-transitory computer-readable storage medium, storing a computer program, wherein the computer program, when being executed by a processor, causes the processor to perform the following operations:
obtaining a current ambient brightness value of the mobile terminal;
determining a target working mode of the infrared acquisition device according to the current ambient brightness value; and
acquiring an iris image of a current user in the target working mode via the infrared acquisition device,
wherein the infrared acquisition device comprises an infrared camera and a supplementary infrared light device, and wherein
the supplementary infrared light device comprises a supplementary infrared light lamp and a light filter;
the target working mode of the infrared acquisition device comprises a first working mode and a second working mode;
in the first working mode, light emitted by the supplementary infrared light lamp is filtered through the light filter so as to filter out part of visible light; and
in the second working mode, the light emitted by the supplementary infrared light lamp is not filtered through the light filter, and in response to the infrared light lamp not being filtered by the light filter, prompts a position of the infrared acquisition device via the visible light.

16. The non-transitory computer-readable storage medium according to claim 15, wherein determining the target working mode of the infrared acquisition device according to the current ambient brightness value comprises:
in response to determination of the target working mode of the infrared acquisition device being the first working mode, locating the light filter to be aligned with the supplementary infrared light lamp in a light-emitting direction of the supplementary infrared light lamp; or,
in response to determination of the target working mode of the infrared acquisition device being the second working mode, locating the light filter to be non-overlap with the supplementary infrared light lamp when observed in the light-emitting direction of the supplementary infrared light lamp.

17. The non-transitory computer-readable storage medium according to claim 15, wherein determining the target working mode of the infrared acquisition device according to the current ambient brightness value comprises:
   determining the target working mode of the infrared acquisition device according to a pre-stored mapping relationship between ambient brightness values and the working modes of the infrared acquisition device.

18. The non-transitory computer-readable storage medium according to claim 17, wherein determining the target working mode of the infrared acquisition device according to the pre-stored mapping relationship between the current ambient brightness value and the working modes of the infrared acquisition device comprises:
   in response to obtaining of the current ambient brightness value being greater than or equal to a preset brightness threshold value, determining that the target working mode is the first working mode; and
   in response to obtaining of the current ambient brightness value being lower than the preset brightness threshold value, determining that the target working mode is the second working mode.

19. The non-transitory computer-readable storage medium according to claim 15, wherein the computer program, when being executed by the processor, causes the processor to further perform the following operations:
   performing iris image quality assessment, iris region positioning, iris preprocessing and iris feature point extraction, to generate an iris template, after the iris image is acquired.

20. The non-transitory computer-readable storage medium according to claim 15, wherein for the light filter, transmittance of infrared light with a wavelength of greater than or equal to 810 nm is higher than 80%, and transmittance of visible light with a wavelength of smaller than 810 nm is lower than 5%.

* * * * *